United States Patent

Egner-Walter

[11] Patent Number: 6,099,195
[45] Date of Patent: Aug. 8, 2000

[54] CONNECTION OF A SPINDLE AND/OR STUD WITH A CRANK LEVER OF A WIPER SYSTEM

[75] Inventor: Bruno Egner-Walter, Heilbronn, Germany

[73] Assignee: ITT Automotive Europe, GmbH, Frankfurt, Germany

[21] Appl. No.: 08/908,474

[22] PCT Filed: Mar. 9, 1994

[86] PCT No.: PCT/EP94/00718

§ 371 Date: Sep. 13, 1995

§ 102(e) Date: Sep. 13, 1995

[87] PCT Pub. No.: WO94/21499

PCT Pub. Date: Sep. 29, 1994

Related U.S. Application Data

[63] Continuation of application No. 08/525,694, Sep. 13, 1995, abandoned.

[30] Foreign Application Priority Data

Mar. 13, 1993 [DE] Germany .............................. 43 07 994

[51] Int. Cl.$^7$ ..................................................... B25G 3/28
[52] U.S. Cl. ......................... 403/282; 403/279; 403/244; 15/250.31
[58] Field of Search ................................... 403/279, 281, 403/282, 284, 278, 276, 274, 298, 242, 244; 15/250.31, 250.3, 250.16

[56] References Cited

U.S. PATENT DOCUMENTS

| | | | |
|---|---|---|---|
| 759,834 | 5/1904 | Steele | 403/274 X |
| 1,190,759 | 7/1916 | Harrington | 403/274 |
| 1,351,852 | 9/1920 | Hooper | 403/274 |
| 1,363,496 | 12/1920 | Crocker | 403/284 |
| 1,536,506 | 5/1925 | Laganke | 15/250.3 |
| 2,613,771 | 10/1952 | Levine | 403/274 X |
| 4,205,426 | 6/1980 | Stillman, Jr. | 403/274 X |
| 5,067,198 | 11/1991 | Ishikawa et al. | 15/250.31 X |
| 5,142,939 | 9/1992 | Bauer et al. | 403/274 X |
| 5,372,449 | 12/1994 | Bauer et al. | 403/282 X |

FOREIGN PATENT DOCUMENTS

| | | | |
|---|---|---|---|
| 0316832 | 5/1989 | European Pat. Off. . | |
| 2550287 | 2/1985 | France . | |
| 3443373 | 11/1984 | Germany . | |
| 3643474 | 6/1988 | Germany . | |
| 3738924 | 6/1989 | Germany . | |
| 0018750 | 1/1989 | Japan | 15/250.31 |
| 2151915 | 7/1985 | United Kingdom . | |

OTHER PUBLICATIONS

Machine Design, May 21, 1987, No. 12, Cleveland, Ohio "Fastening Parts to Shafts" by Federico Strasser.

Primary Examiner—Brian K. Green
Assistant Examiner—William L. Miller
Attorney, Agent, or Firm—J. Gordon Lewis

[57] ABSTRACT

Fastening of a spindle or of another elongated cylindrical component perpendicularly to a lever. This fastening essentially consists in providing the galvanized deep-drawn sheet steel lever with a suitable rim hole into which the spindle is inserted. The spindle is secured against moving axially in relation to the lever by a peripheral projection which is formed by rolling the rim hole surface and which projects into a corresponding groove in the spindle.

9 Claims, 2 Drawing Sheets

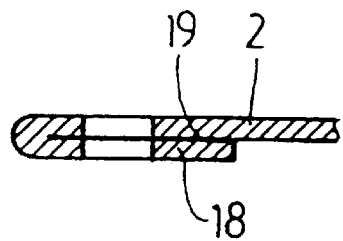
Fig. 6
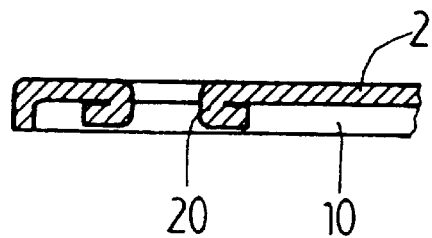
Fig. 7
Fig. 8
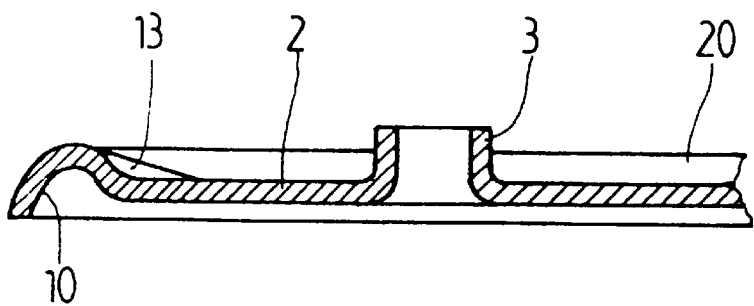
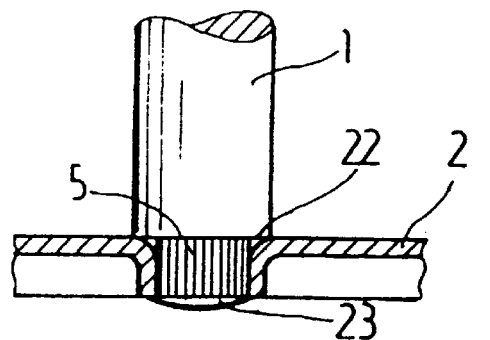
Fig. 9

CONNECTION OF A SPINDLE AND/OR STUD WITH A CRANK LEVER OF A WIPER SYSTEM

This application is a continuation of U.S. Ser. No. 08/525,694 filed Sep. 13, 1995 now abandoned.

TECHNICAL FIELD

This invention relates to wiper systems and more particularly to a gear part of a wiper system of automotive vehicles where a drivable spindle and/or a stud are connected with a crank lever.

BACKGROUND

From DE-OS No. 3 738 924, a spindle featuring splines and a groove is known which is undetachably connected with a crank lever by way of cold working. A disadvantage of this type of connection is that, for achieving the required strength, the material of the lever has to be comparatively thick in order to obtain a sufficient lever abutment surface on the spindle. Further, cold-working the lever requires lever surface treatment after any individual processing operation so as to prevent corrosion. Thus, this known manufacturing method requires a considerable effort and expenditure.

From DE-OS No. 3 643 747 it is further known to manufacture the lever from galvanized deep-drawn sheet metal and to provide for an enlarged abutment surface between lever and spindle in that so-called rim holes are formed by deep drawing. These rim holes are peripheral collar-type rims abutting the spindle with their surface areas which extend along the longitudinal direction of the spindle. In DE-OS No. 3 643 474, the respective rim hole tapers towards its free end and receives a correspondingly conically shaped and splined spindle portion. The end of the spindle which penetrates the rim hole is provided with a thread which allows the spindle to be wedged detachably with the rim hole by means of a securing nut. The processing needed for such a type of connection as well as the number of the necessary individual components impose considerable requirements.

Thus, the present invention includes a gear part which features a particularly simple design and suggests a durable connection between the crank lever and the spindle.

This invention solves its object by making use of the accessibility of the outer surface area of the rim hole so that the rim hole can be connected durably with the spindle in a simple manner. In this way it is possible to connect the lever of deep-drawn sheet metal undetachably and in an inexpensive manner with the spindle, yet also with any other component such as with a stud or ball pin. The principle of this connection type consists in that, after the insertion of the spindle, projections will be molded into the rim hole from its outer surface area which will project into corresponding recesses within the spindle, thus securing the same in relation to the lever. Preferably, the recess may be a peripheral groove engaged by individual projections of the rim hole or, also, by a peripheral projection of the rim hole.

In order to achieve a particularly good fixation against axial twisting, forces are applied to the outer surface area of the rim hole thereby pressing the inside surface area of the rim hole into the splines. By pressing the spindle into the collar and thus causing the collar to widen, such a technique is particularly advantageous for deep drawing. In this case a reduced deformation will keep the opening width of the rim hole smaller than the diameter of the spindle which will then be pressed into the opening, thus the splines of the spindle cutting into the inside surface area of the rim hole.

It is easy to see that using galvanized deep-drawn sheet metal as a rule will be less expensive than the use of compact steel components whose surfaces will require additional finishing and refinement after the individual processing operations. It is a special feature of the zinc which coats the sheet steel that, in the process of the deformation and punching operations, the zinc will smear over the newly formed surface and thus in a simple manner provides for a durable rust protection. Preferably, lever areas are punched out which are not necessary for the strength behaviour of the lever. These areas can be enlarged in particular by reinforcing the strength of the lever by means of stiffening corrugations. Punching the clearances out will on the one hand produce a saving in terms of material and, hence, in terms of weight without the lever, as already described further above, having to be protected against corrosion by means of separate measures.

A further advantage results in that, the flux of force between the spindle and the lever is spread over the entire circumference of the rim hole. Amongst other things, this results from the increased elasticity of the lever. A further possibility of reinforcing the area of connection between lever and spindle results from constructing, at least in the area of connection of the spindle and/or stud, the crank lever from of two superimposed coats of galvanized sheet steel which are formed by folding. This allows to increase the material thickness of the lever locally, yet simultaneously not excluding the deep-drawn molding of rim holes.

Any expert will easily realize that the possibility of connection described for the spindle in relation to the lever will also apply to other components such as studs or ball pins, pins and the like. This invention is thus not restricted to the application of this connection between spindle and lever.

Manufacturing the rim holes and/or stiffening corrugations is made particularly easy by pointing the stiffening corrugation in the same direction. In this case, it is possible to reduce the number of the operations and of the tools used.

BRIEF DESCRIPTION OF THE DRAWINGS

FIGS. 6 and 7 show foldings performed on the lever in order to save material.

FIG. 8 shows a lever with a rim hole and a corrugation pointing in the same direction.

FIG. 9 shows a further embodiment of this invention.

DETAILED DESCRIPTION OF THE PREFERRED EMBODIMENTS

Figure 1:
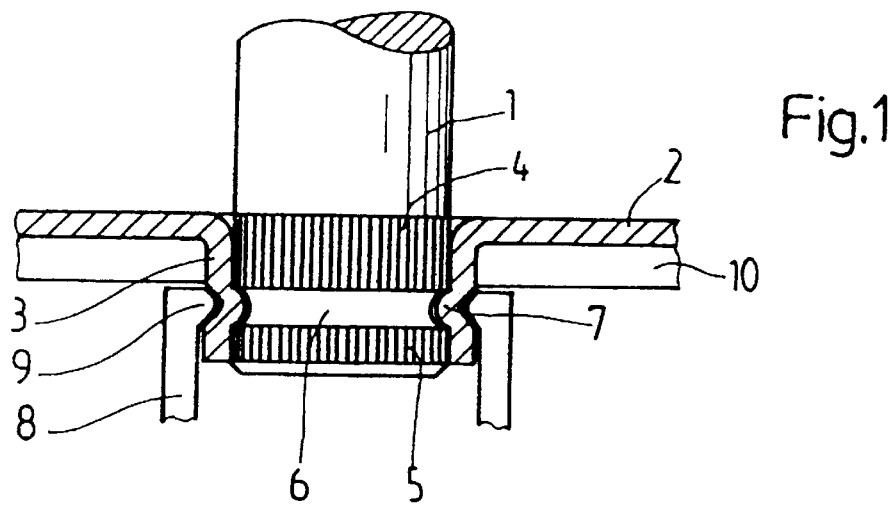
FIG. 1 shows an inventive type of connection of a spindle to a lever.

In FIG. 1 a spindle 1 is connected to a lever 2. The crank lever 2 is of galvanized sheet steel, with a so-called rim hole 3, i.e. a peripheral collar, being molded into the lever 2 by means of deep drawing. Inserted into this collar is that area of the spindle 1 which is provided with splines 4, 5. In doing so, a firm seat is formed. This measure secures the spindle 1 in relation to the lever 2 against twisting around the longitudinal axis of the lever.

In the area of the splines 4, 5, the spindle 1 is additionally provided with a peripheral groove 6 engaged by a peripheral projection 7 of the rim hole 3. This secures the spindle against lengthwise displacement in relation to the lever 2.

The peripheral projection 7 can be formed by adjusting a tool 8 with its outlined jaws 9 so that an area of the rim hole is peripherally pressed into the groove 6 and thus engages the side walls of the groove from behind. This operation is known as rolling.

To reinforce the lever 2 against bending the same is provided with stiffening corrugations 10 which, for instance, may surround the lever edge peripherally.

Figure 2:
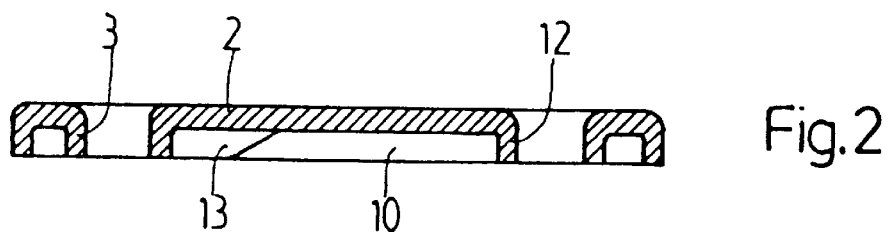
FIGS. 2 and 3 show several rim holes arranged on a lever, as well as clearances.

FIG. 2 outlines the possibility of providing a second rim hole 12 besides a first rim hole 3 for holding a spindle, said second rim hole 12, for instance, allowing a ball stud or any other component of the crank lever 2 to be connected analogously to spindle 1.

Again, the lever 2 is provided with at least one stiffening corrugation peripherally surrounding the outer edge of the lever 2. Besides this corrugation 10 it is possible to mold on a further stiffening corrugation 13, extending along the longitudinal direction of the lever 2, as can be seen from FIGS. 2 and 3. Additional corrugations 14 can extend crosswise in relation to corrugation 13 so that corrugations 13 and 14 are directed radially towards the rim hole 3.

Figure 3:
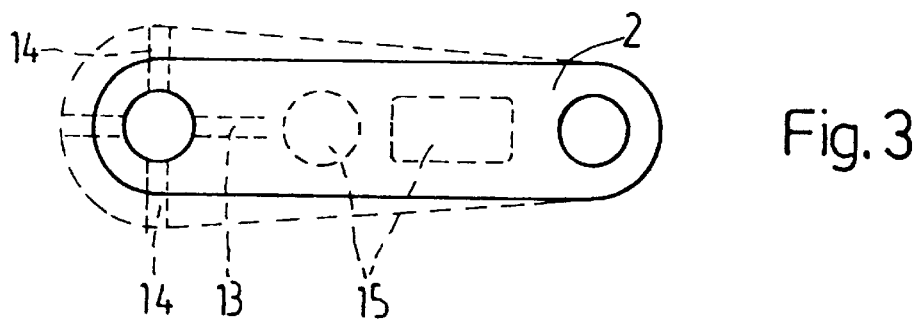

FIG. 3 moreover outlines the possibility of punching out clearances 15 in order to save weight and to generate a greater elasticity of the lever 2. These clearances allow an advantageous influence on the flux of force during the transmission of forces between spindle 1 and lever 2.

Figure 4:
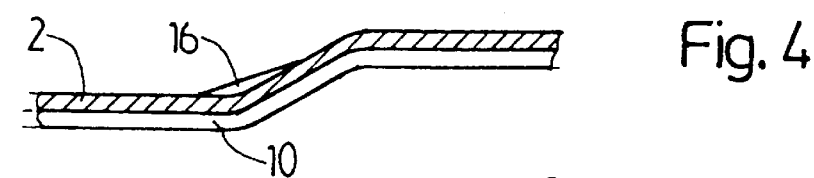
FIGS. 4 and 5 show the use of stiffening corrugations.
Figure 5:
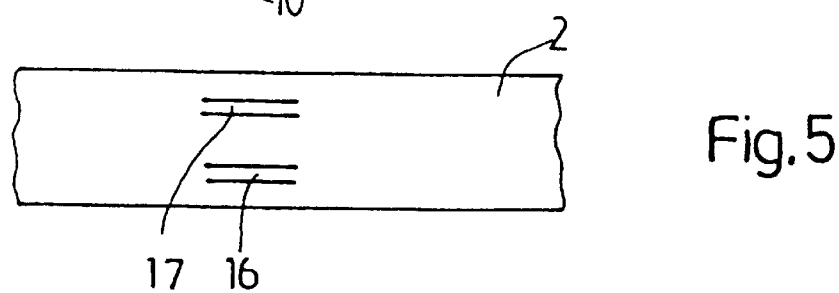

FIG. 4 outlines the possibility of bending the lever 2 so that it will extend in two planes parallel to each other. Again, for the purpose of increasing the strength, the point of transition can be provided with separate stiffening corrugations 16, 17 as also can be seen clearly in FIG. 5. There, the corrugations extending along the longitudinal direction of the lever 2 are offset parallel to each other.

FIGS. 6 and 7 show further possibilities of reinforcing the lever 2 on the level of the connecting area by means of folding the deep-drawn sheet steel. In doing so, it is possible to fold a larger portion. Relatively small bending forces are needed to do so and a comparatively large connecting surface 19 will be obtained to which the folded portion 18 may be connected with the remaining part 2 of the lever by means of welding, gluing, riveting or self-riveting. Another possibility of folding is outlined in FIG. 7 where a rim hole is elongated until it may be turned back to form a folded annular portion 20. The advantage of the embodiment of FIG. 7 inter alia consists in that, again, it is possible to provide corrugations 10 while, simultaneously, it is not necessary to align the two cutting edges of lever 2 and portion 18 of FIG. 6 with regard to each other.

FIG. 8 shows the possibility of designing the corrugation 13 and the rim hole 3 so that they will point in the same direction. This applies correspondingly to corrugation 20 which surrounds the outer edge of the lever 2. The edge 10 drawn downwards is designed in correspondence with FIGS. 1, 2, 3, and 4.

Another possibility of connecting the spindle in the opening is represented in FIG. 9. In accordance therewith, the spindle has a shoulder 22 forming a stop on crank lever 2. This stop may be provided by a peripheral projection. However, as illustrated in FIG. 9, it may also be formed in that the splines-5-carrying portion at the end of the spindle 1 has a smaller diameter than the remainder of the spindle 1. In FIG. 9, the spindle 1 is in this way axially secured downwards. Securing in the opposite direction, upwards, is brought about in FIG. 9 in that an overhanging part of the spindle end is molded so as to form a rivet head 23 engaging the opening in the crank lever 2 from behind.

What is claimed is:

1. A gear part for a wiper system of automotive vehicles comprising:

a crank lever made from sheet metal and having an opening therein, said opening surrounded by a peripheral collar, said collar extending generally perpendicularly from said opening, a driveable spindle penetrating said opening, fastening means consisting of a peripheral groove molded into the spindle, into which there projects at least one projection jutting out and formed by radially denting areas of the peripheral collar into the groove;

said groove and said projection having generally arcuate, complementary shaped engaging surfaces.

2. A gear part as claimed in claim 1, wherein the peripheral collar is formed by means of deep drawing and in that the projection is a peripheral projection engaging the groove and wherein said radially denting is performed by means of rolling.

3. A gear part as claimed in claim 1 wherein the spindle is formed of a stronger material than the crank lever and in that the area adjoining the groove is provided with splines.

4. A gear part as claimed in claim 3, wherein the spindle diameter is greater than the width of the collar and the spindle is axially pressed into the collar whereby the collar is widened.

5. A gear part as claimed in claim 1 wherein punched out areas are provided on the lever.

6. A gear part as claimed in claim 1, wherein the lever is adapted to receive and fasten a stud in the same manner as the spindle.

7. A gear part as claimed in claim 1, wherein the radial and peripheral stiffening corrugations and the collar of the crank lever point in the same direction.

8. A gear part for a wiper system of automotive vehicles comprising:

a crank lever having an opening therein, said opening surrounded by a peripheral collar, said collar extending longitudinally from said opening, a driveable spindle penetrating said opening, fastening means consisting of a peripheral groove molded into the spindle, into which there projects at least one projection jutting out and formed by radially denting areas of the peripheral collar into the groove;

wherein the crank lever is provided with at least one radial stiffening corrugation, extending radially toward said opening, and with at least one peripheral stiffening corrugation arranged on an edge of the lever.

9. A gear part as claimed in claim 8, wherein the spindle includes a plurality of splines located in an area immediately adjacent the groove.

* * * * *